United States Patent
Chen et al.

(10) Patent No.: US 11,444,686 B2
(45) Date of Patent: Sep. 13, 2022

(54) TRANSMODULATION FOR A MULTI-BEAM SATELLITE COMMUNICATION SYSTEM

(71) Applicant: Hughes Network Systems, LLC, Germantown, MD (US)

(72) Inventors: Liping Chen, Bethesda, MD (US); Rohit Iyer Seshadri, Gaithersburg, MD (US); Mustafa Eroz, Rockville, MD (US); Lin-Nan Lee, Potomac, MD (US); Stan Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/137,269

(22) Filed: Dec. 29, 2020

(65) Prior Publication Data
US 2022/0209851 A1 Jun. 30, 2022

(51) Int. Cl.
*H04B 7/185* (2006.01)
*H04L 27/36* (2006.01)
*H04L 1/00* (2006.01)

(52) U.S. Cl.
CPC ....... *H04B 7/18513* (2013.01); *H04L 1/0005* (2013.01); *H04L 27/364* (2013.01)

(58) Field of Classification Search
CPC .. H04B 7/18513; H04L 1/0005; H04L 27/364
See application file for complete search history.

(56) References Cited

U.S. PATENT DOCUMENTS

| | | | |
|---|---|---|---|
| 9,553,754 B1* | 1/2017 | Dorosenco | H04L 27/3863 |
| 2002/0026643 A1* | 2/2002 | Ewen | H04L 27/00 725/111 |
| 2017/0324468 A1* | 11/2017 | Lee | H04L 1/0042 |
| 2019/0132044 A1* | 5/2019 | Hreha | H04B 7/18543 |
| 2019/0132750 A1* | 5/2019 | Yaghmour | H04H 20/74 |
| 2019/0229836 A1* | 7/2019 | Perotti | H04L 1/0006 |
| 2020/0322042 A1* | 10/2020 | Rainish | H04B 7/18578 |

FOREIGN PATENT DOCUMENTS

GB 2538791 B 11/2016

* cited by examiner

*Primary Examiner* — Janice N Tieu
(74) *Attorney, Agent, or Firm* — Kilpatrick Townsend & Stockton, LLP

(57) ABSTRACT

Various arrangements for performing transmodulation of a forward feeder link are presented. A first data stream and a second data stream can be modulated into a higher-order modulation forward feeder link having a higher-order digital modulation scheme. A satellite can receive the higher-order modulation forward feeder link. The satellite can demodulate the higher-order modulator forward feeder link into a bit stream. This bit stream may then be remodulated and retransmitted as multiple forward user links.

20 Claims, 7 Drawing Sheets

TRANSMODULATION FOR A MULTI-BEAM SATELLITE COMMUNICATION SYSTEM

BACKGROUND

The signal-to-interference-plus-noise ratio (SINR or SNIR) is typically lower for signal transmission from a satellite to user equipment than for transmission from a gateway system to the satellite. This difference in SINR can be due at least in part to the relatively low transmission power and antenna gain of the satellite compared to the higher transmission power of a gateway and the greater gain on the gateway's forward link antenna.

In a "bent-pipe" satellite transmission system, a modulated data stream transmitted to the satellite by a gateway is retransmitted by the satellite to user equipment (UE) with no or minimal processing being performed on the modulated data stream by the satellite. Therefore, the modulation used for communication between the satellite and UE can be required to be the same as the modulation between the gateway and the satellite.

SUMMARY

In some embodiments, a forward-link satellite transmodulation system is presented. The system can include a gateway system that includes a forward feeder link creator. The creator can receive a first data stream for a first forward link signal and a second data stream for a second forward link signal. The creator can modulate the first data stream and the second data stream into a higher-order modulation forward feeder link having a higher-order digital modulation scheme. A transmitter may transmit the higher-order modulation forward feeder link to a satellite. The system can include a satellite. The satellite can include a receiver that receives the higher-order modulation forward feeder link. The satellite can include a demodulator that demodulates the higher-order modulator forward feeder link into a raw bit stream. The satellite can include a bit slicer component that separates the raw bit stream into a first bit stream and a second bit stream. The satellite can include a modulator that modulates the first bit stream into a first user equipment (UE) forward link having a first lower-order digital modulation scheme and the second bit stream into a second UE forward link having a second lower-order digital modulation scheme. The higher-order digital modulation scheme is higher order modulation than the first lower-order digital modulation scheme and the second lower-order digital modulation scheme.

Embodiments of such a system can include one or more of the following features: The forward feeder link creator can include: a first modulator that modulates the first data stream using the first lower-order digital modulation scheme; and a second modulator that modulates the second data stream using the second lower-order digital modulation scheme. The forward feeder link creator can include: a first raw bit stream creator that receives a first output of the first modulator and outputs a first raw bit stream; and a second raw bit stream creator that receives a second output of the second modulator and outputs a second raw bit stream. The forward feeder link creator can include a feeder link modulator that modulates the first raw bit stream and the second raw bit stream into the higher-order modulation forward feeder link having the higher-order digital modulation scheme. The satellite can include a transmitter that transmits the first UE forward link and the second UE forward link. The transmitter can transmit the first UE forward link to a different geographical region than the second UE forward link. The transmitter can transmit the first UE forward link to a same geographical region than the second UE forward link. The first lower-order digital modulation scheme and the second lower-order digital modulation scheme can be a same modulation scheme but is different than the higher-order digital modulation scheme. The first lower-order digital modulation scheme and the second lower-order digital modulation scheme can be different modulation schemes and are additionally different than the higher-order digital modulation scheme. A fixed code length can be used for the first lower-order digital modulation scheme and the second lower-order digital modulation scheme. A fixed frame length can be used for the first lower-order digital modulation scheme and the second lower-order digital modulation scheme. The gateway system can be a gateway to the Internet. The first data stream and the second data stream can include data received by the gateway from the Internet being transmitted by remote server system to UE via the first data stream and the second data stream. The higher-order digital modulation scheme can be 256 QAM.

In some embodiments, a method for performing transmodulation of a forward feeder link is presented. The method can include receiving a first data stream for a first forward link signal and a second data stream for a second forward link signal. The method can include modulating the first data stream and the second data stream into a higher-order modulation forward feeder link having a higher-order digital modulation scheme. The method can include receiving, by a satellite, the higher-order modulation forward feeder link. The method can include demodulating, by the satellite, the higher-order modulator forward feeder link into a raw bit stream. The method can include separating, by the satellite, raw bit stream into a first bit stream and a second bit stream. The method can include modulating, by the satellite, the first bit stream into a first user equipment (UE) forward link having a first lower-order digital modulation scheme and the second bit stream into a second UE forward link having a second lower-order digital modulation scheme. The higher-order digital modulation scheme uses higher order modulation than the first lower-order digital modulation scheme and the second lower-order digital modulation scheme.

Embodiments of such a method can include one or more of the following features: The first data stream can be modulated using the first lower-order digital modulation scheme. The second data stream can be modulated using the second lower-order digital modulation scheme. A first raw bit stream can be created based on the modulated first data stream. A second raw bit stream can be created based on the modulated second data stream. The method can include modulating the first raw bit stream and the second raw bit stream into the higher-order modulation forward feeder link having the higher-order digital modulation scheme. The method can include transmitting, by a satellite, the first UE forward link to a different geographical region than the second UE forward link. The method can include transmitting, by a satellite, the first UE forward link to a same geographical region as the second UE forward link. The first lower-order digital modulation scheme and the second lower-order digital modulation scheme can be a same modulation scheme but is different than the higher-order digital modulation scheme.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In embodiments detailed herein, higher-order modulation for the forward feeder link from the gateway to the satellite can be used for forward link data transmission than the modulation used for forward user links from the satellite to user equipment. By using different modulation for the forward feeder link compared to forward user links, a greater amount of data can be transmitted on the forward feeder link per unit bandwidth. The satellite can perform a transmodulation process to covert the received higher-order forward feeder link into multiple lower-order modulated forward user links. Therefore, a single feeder link can be used to transmit the data to a satellite for transmodulation and retransmission by the satellite to UE as two or more forward user links of the same bandwidth.

Embodiments detailed herein are focused on transmodulation, as opposed to transcoding. Notably, there is a difference between transmodulation and transcoding, which can involve a complexity/performance trade-off. Transcoding involves demodulating, decoding, recoding, and remodulating data, such as the uplink, into multiple downlinks at considerable complexity and power on the satellite. In contrast, for transmodulation, only demodulation and remodulation is performed at a much lower complexity with potentially only a minor performance penalty over the range of uplink SINR of interest.

By using a different, higher-order modulation for the forward feeder link compared to the forward user links, the SINR of the forward user links may not constrain what modulation can be used for the forward feeder link. By having a higher data rate due at least in part to the higher-order modulation on the forward feeder link, the number of gateways needed to transmit forward feeder links can be reduced. Additionally or alternatively, the total forward capacity of the forward link can be increased while maintaining the same number of gateways.

Figure 1:
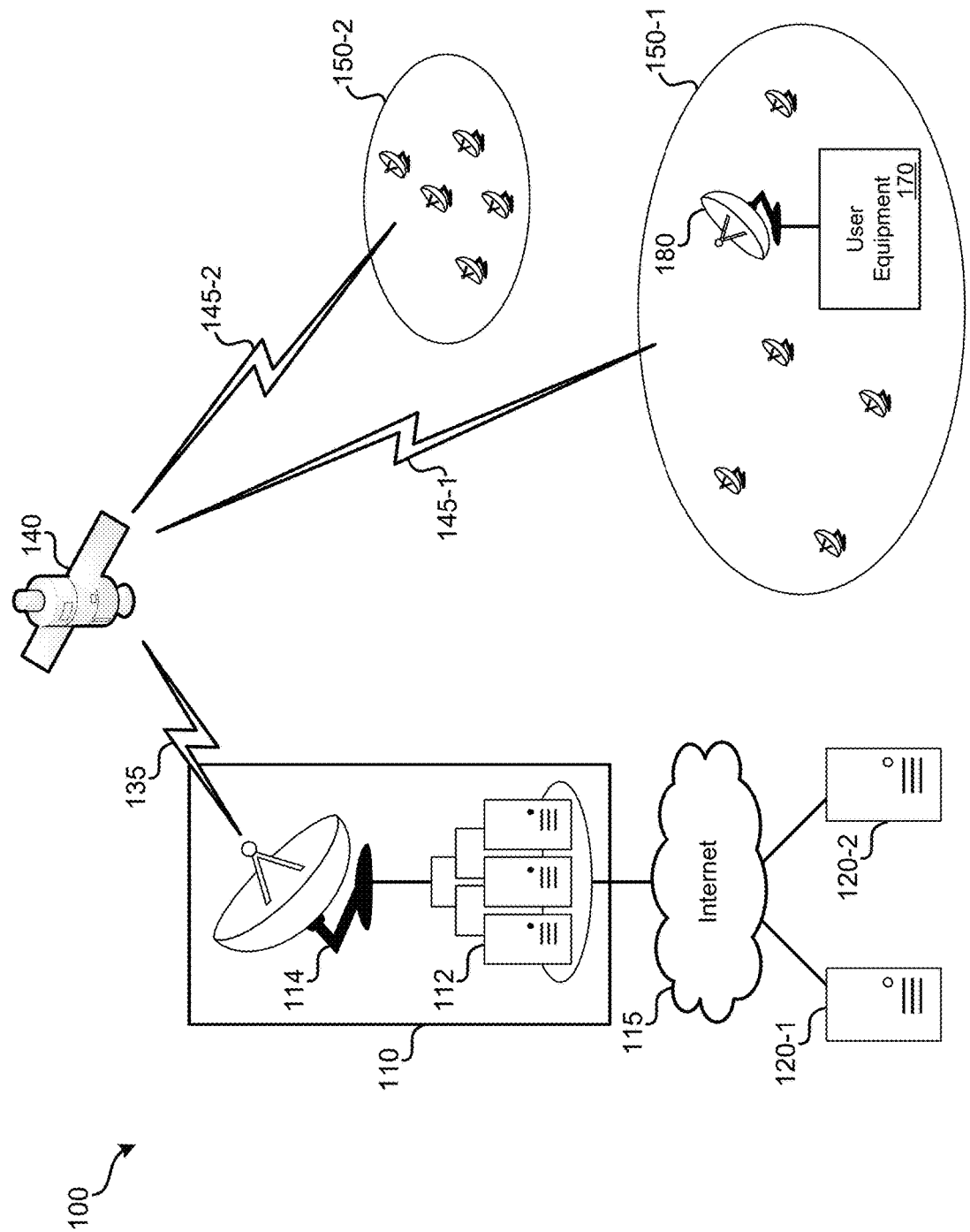
FIG. 1 illustrates a block diagram of an embodiment of a forward-link satellite transmodulation system.

FIG. 1 illustrates a block diagram of an embodiment of a forward-link satellite transmodulation system 100 ("system 100"). System 100 can include: gateway system 110; one or more networks, such as Internet 115; computer systems 120; satellite 140; user equipment (UE), such as UE 170; and UE antenna 180. Gateway system 110 may serve as a gateway between one or more networks, such as Internet 115 and one or more satellites, such as satellite 140. UE may communicate with gateway system 110 via satellite 140 to access Internet 115. Via Internet 115, various computer servers may be accessed, such as computer server 120-1 and computer server 120-2. When data is to be transmitted from such a remote computer server, data may be transmitted to gateway system 110. Gateway system 110 can include multiple components including: forward feeder link creator 112 and transmit antenna 114.

A forward link involves transmission of data via satellite 140 from gateway system 110 to UE. (A reverse link transmits data via satellite 140 from UE to gateway system 110.) The forward link includes forward feeder link 135, which represents a signal being transmitted from gateway transmit antenna 114 to satellite 140. The forward link further includes forward user links 145 (e.g., 145-1, 145-2).

The SINR for forward feeder link 135 may be significantly higher than the SINR for individual forward user links of forward user links 145. The power level used for transmitting RF by satellite 140 is part constrained by factors such as the amount of power that satellite 140 can generate on-board using solar panels. In contrast, the transmit power used to transmit via antenna 114 is effectively not power constrained and antenna 114 may have a significantly higher gain than the satellite's transmit antenna. Therefore, the SINR of forward feeder link 135 can be expected to almost always be significantly greater than the SINR of any forward user link of forward user links 145.

In embodiments detailed herein, a higher order modulation is used by forward feeder link creator 112 for modulating the forward feeder link than is used for modulation of forward user links 145. By a higher modulation being used for forward feeder link 135, the bandwidth available for transmitting data from gateway system 110 to satellite 140 is increased. For example, 256 QAM may be used for the higher-order modulation on forward feeder link 135 and 16 QAM may be used for one or both of the forward user links 145. Therefore, a single forward feeder link, such as forward feeder link 135, can be used to transmit all data needed for satellite 140 to transmodulate and transmit two or more lower-order modulation forward user links. In the illustrated embodiment of FIG. 1, forward feeder link 135 is transmodulated and retransmitted as two forward user links; however, in other embodiments, a greater number of forward user links may be created from a single forward feeder link. Said another way, the data rate of the feeder link can be equal to or greater than the sum of the data rate of each forward user link created from the feeder link.

The multiple forward user links may reuse the same frequency spectrum. For instance, forward user links 145 may service different geographical regions, such as illustrated in FIG. 1. In FIG. 1, UE within geographic region 150-2 receive data via forward user link 145-2 and UE within geographic region 150-1 receive data via forward user link 145-1. Alternatively, forward user links 145 may service the same or overlapping geographical regions using different frequency spectrum. An example of UE is present as UE 170, which uses a dish antenna 180 (or a phased-array antenna or some other type of antenna) to receive forward user link 145-1 from satellite 140. Each forward user link may service one or more instances of UE. UE may function as an access point (AP) to allow one or more other devices (e.g., wired or wireless computerized devices) to access networks, such as Internet 115. System 100 can provide UE (and computerized devices in communication with UE) with broadband Internet services. For instance, media or data may be streamed or transmitted to UE by computer systems 120 via system 100.

Figure 2:
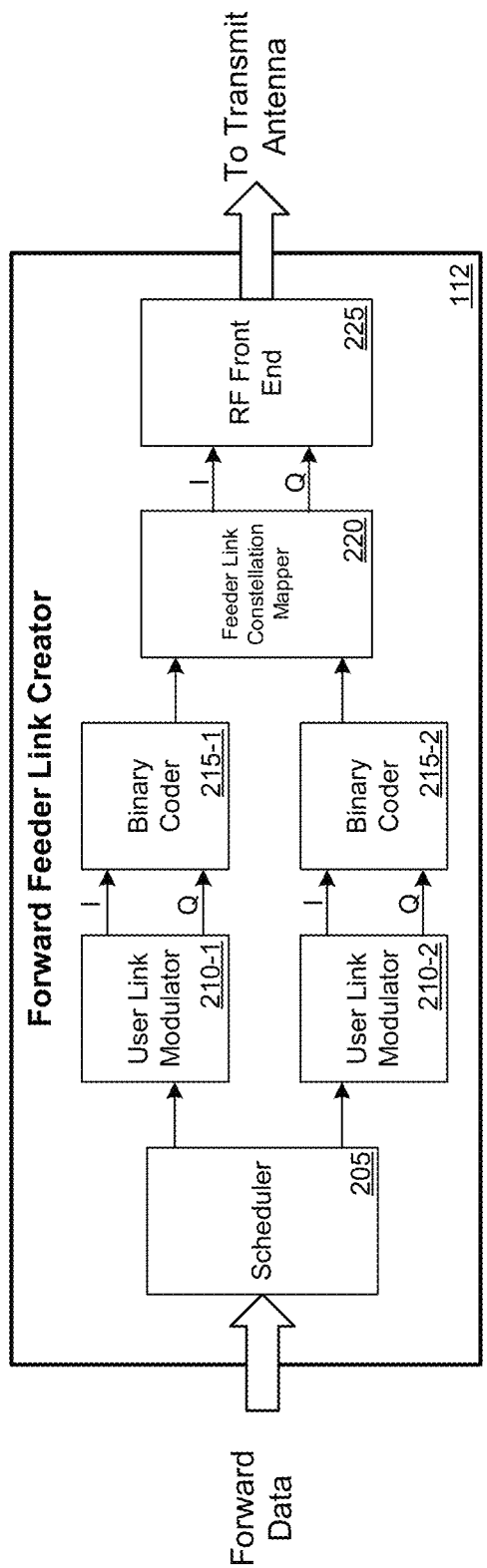
FIG. 2 illustrates a block diagram of an embodiment of a forward feeder link creator.
Figure 3:
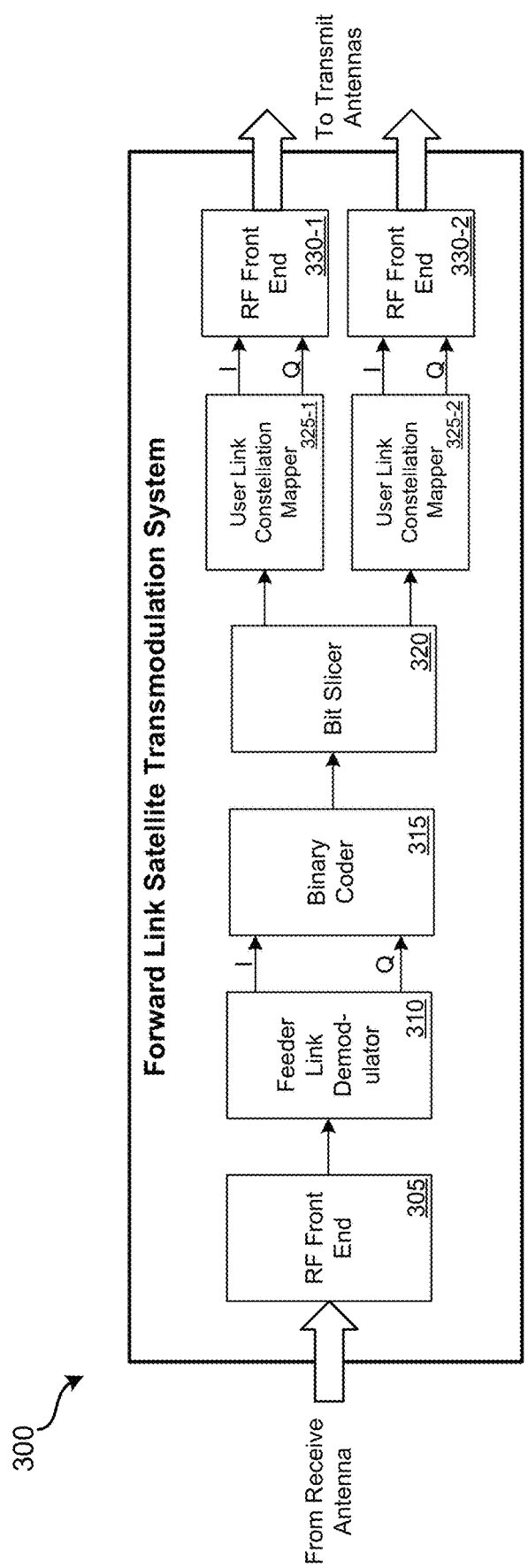
FIG. 3 illustrates a block diagram of an embodiment of a forward link satellite transmodulation system for use on a satellite.

Further detail regarding forward feeder link creator 112 and satellite 140 is provided in relation to FIGS. 2 and 3, respectively. FIG. 2 illustrates a block diagram of an embodiment of a forward feeder link creator 112. Forward feeder link creator 112 can include: scheduler 205; user link modulators 210; binary coders 215; feeder link constellation mapper 220; and RF front-end 225.

Forward feeder link creator 112 may include both analog RF circuitry and computerized components. Computerized components may be used to perform the functions of components such as: scheduler 205; user link modulators 210; binary coders 215; and feeder link constellation mapper 220. DACs, amplifiers, and analog components may be used to implement RF front-end 225. The computerized components may be implemented using specialized software executed on general purpose processing system (that can include one or more processors). Alternatively, specialized hardware (e.g., ASICs) may be created to perform such functions or may use firmware to configure general-purpose hardware as specialized hardware (e.g., FPGAs, eASICs).

Scheduler 205 may receive data from one or more networks, such as the Internet. The data may be addressed to various UE that receive one or more forward user links from the satellite. Scheduler 205 may buffer and schedule when the received data should be transmitted by the gateway to the addressed UE via satellite. For example, scheduler 205 may ensure that each UE is allocated only up to a certain amount of bandwidth, such as in accordance with a services agreement. Scheduler 205 may prioritize data based on its type, such as to ensure a quality of service (QoS) level. Scheduler 205 may assign data to be transmitted to UE to a user link that will be received by the UE. This can include determining the correct user link that the UE is receiving and/or the correct user link that services the geographic region of the UE. In the illustrated example of FIG. 2, scheduler 205 creates separate data streams for two forward user links. In this example, the higher-order modulation used for the feeder link has sufficient data rate to service two forward user links that use lower-order modulation. In other embodiments, the higher-order modulation feeder link can have sufficient data rate to service three or more lower-order modulation forward user links; in such embodiments scheduler 205 would output a separate data stream for each forward user link.

User link modulators 210 receive a data stream to be transmitted as a particular forward user link and perform modulation. User link modulators 210 may operate according to the DVBS2 (digital video broadcasting, second generation) standard, which can be used for purposes such as: standard definition broadcasts, high definition broadcasts, and/or broadband internet services. User link modulators 210 may perform tasks in addition to modulation, such as pilot insertion and scrambling of the payload. Therefore, it may be beneficial to retain user link modulators 210 even though modulation will be performed again by feeder link constellation mapper 220. The modulation used for particular data within the data stream received by each user link modulator may be based on the SINR between the satellite and the particular UE the data is addressed to. Therefore, within a particular forward user link, multiple different lower order modulations may be used serially. For example, a first piece of user equipment that has a high SINR for the forward link may use a relatively higher order modulation compared to another piece of UE that has a lower SINR for the forward link.

Each of user link modulators 210 may output an I (in-phase) and a Q (quadrature) channel. The output of user link modulators 210 may be a forward user link signal that has been modulated, possibly along with other data added, such as for packet headers and calibration. For example, for ASK-based or QAM-based modulation, the I and Q channels may be out of phase by 90° (a condition referred to as quadrature). User link modulators 210-1 and 210-2 may concurrently use the same or different modulations.

Binary coders 215 may convert each symbol of the I and Q channels output by user link modulators 210 into raw streams of binary data. Retained within this binary stream of data may be processing that user link modulators 210 performed, such as pilot insertion and scrambling of the payload. Each complex symbol from the I and Q channels may be used to generate some number of bits based on the modulation used. Binary coders 215 have access to multiple stored symbol mappings (also referred to as symbol constellations) for multiple different modulations. For example, different symbol constellation mappings are used for pi/2 BPSK, QPSK, 8PSK, 16 APSK, 8-QAM, etc. If DVBS2 is used, two different modulations may be used within codewords, including pi/2 BPSK modulation for the PLHeader and a separate payload modulation.

In some scenarios, the constellation mapping used for the header (pi/2 BPSK) overlaps with the constellation used for the payload. Therefore, if the payload constellation is used for binary conversion of the header, the correct value can be obtained and output for the header. However, for some modulations, the header modulation constellation does not accurately overlap with the payload constellation. For example, if pi/2 BPSK is used for the header and 16APSK is used for the payload, using 16APSK to interpret the header results in incorrect binary values. In such embodiments, amplitude scaling may be used for the pi/2 BPSK symbols to overcome the conflict.

Based upon the symbol of the I and Q channels, binary coder 215 outputs a corresponding sequence of bits. Therefore, the output of binary coder 215-1 is a binary stream of data for the first forward user link; the output of binary coder 215-2 is a second binary stream of data for the second forward user link. Each of these binary streams can be fed to feeder link constellation mapper 220. The binary streams may be concatenated together such that the first half and second half of a string of concatenated bits can be mapped to the in-phase and quadrature components of the feeder link constellation. For example, in the example of a 256-QAM constellation, the first four bits of the symbol can correspond to the binary stream received from binary coder 215-1 and the last four bits of the symbol can correspond to the binary stream received from binary coder 215-2. Therefore, each created symbol contains half binary data from the first binary stream and half binary data from the second binary stream. Additionally or alternatively, bit order manipulation can be applied to the bits of each feeder link symbol to improve performance. The bit order manipulation may be different per user link MODCODE (i.e., modulation and code rate) for a specific feeder link constellation.

Feeder link constellation mapper 220 may modulate the first and second binary streams together using a higher-order modulation that is selected based on the SINR of the forward feeder link. For example, the higher order modulation may be 256 QAM (or some other modulation, such as 64 QAM, 512 QAM, or 1024 QAM, etc.), which can represent a modulation that requires too high of a SINR for use as a forward user link. Feeder link constellation mapper 220 may use a Gray code constellation mapping. Such a mapping may help decrease errors due to interference or noise. The output of feeder link constellation mapper 220 may be I and Q channels that have been modulated using the higher order modulation then was used by user link modulators 210. The data rate of the higher order modulation used by feeder link constellation mapper 220 may be equal to or greater than the sum of the data rates of the output of user link modulators 210. In addition to mapping the binary data to complex I/Q symbols for transmission, feeder link constellation mapper 220 may manage the creation of feeder link frames, as detailed in relation to FIGS. 4A and 4B.

An advantage to using both user link modulators 210 prior to modulation by feeder link constellation mapper 220 may be that significant reconfiguration of current gateway systems can be avoided. For example, gateway systems currently deployed include modulators that function as user link modulators 210 (however, such systems do not have binary coders 215 and feeder link constellation mapper 220). Further, such components may already handle pilot insertion and payload scrambling or encryption. In other embodiments, data to be transmitted by the multiple forward user links may be received by the feeder link constellation mapper 220 directly from scheduler 205.

The I and Q channels output by feeder link constellation mapper 220 are provided to RF front-end 225. RF front-end 225 may perform digital to analog conversion, amplification, and/or otherwise convert the output of feeder link constellation mapper 220 into a signal appropriate to be transmitted by transmit antenna 114 of FIG. 1 to the satellite.

FIG. 3 illustrates a block diagram of an embodiment of a forward-link satellite transmodulation system 300 ("system 300"). At a high level, system 300 receives the higher-order modulation feeder link, performs transmodulation, and outputs multiple lower-order modulation forward user links. System 300 can be incorporated as part of and reside on satellite 140. System 300 can include: RF front-end 305; feeder link demodulator 310; binary coder 315; bit slicer 320; user link constellation mappers 325; and RF front-ends 330. System 300 may include both analog RF circuitry and computerized components. Such components can be radiation hardened for space. Computerized components may be used to perform the functions of components such as: feeder link demodulator 310; binary coder 315; bit slicer 320; and user link constellation mappers 325. ADCs, DACs, amplifiers, and analog components may be used to implement RF front-ends 305 and 330. The computerized components may be implemented using specialized software executed on a general purpose processing system (that can include one or more processors). Alternatively, specialized hardware (e.g., ASICs) may be created to perform such functions or may use firmware to configure general-purpose hardware as specialized hardware (e.g., FPGAs, eASICs).

RF front-end 305 may receive the forward feeder link signal from the gateway via a receive antenna on the satellite. RF front-end 305 may perform analog to digital conversion, amplification, and otherwise convert the received analog signal into a signal appropriate to be processed by feeder link demodulator 310.

Feeder link demodulator 310 may receive the signal from RF front-end 305 and demodulate the received higher-order modulated feeder link signal into I and Q components. The I and Q components may be output to binary coder 350. Using the constellation of the higher-order feeder link modulation used, such as 256-QAM, binary coder 315 converts the complex symbol of the received I and Q components from feeder link demodulator 310 into a raw binary stream. The number of bits included in each symbol varies based on the type of modulation used. For instance, when 256-QAM is used, 8 bits are obtained from each transmitted symbol.

Bit slicer 320, which can be referred to as a demultiplexer, can function to demultiplex the raw binary stream received from binary coder 315. Bit slicer 320 may serve to forward bits corresponding to the first forward user link to user link constellation mapper 325-1 and forward bits corresponding to the second forward user link to user link constellation mapper 325-2. Since the symbols encoded by feeder link constellation mapper 220 are split between the first forward user link and the second forward user link in a predefined pattern, bit slicer 320 can use this known pattern to demultiplex the binary data (e.g., the first four bits of each symbol are forwarded to user link constellation mapper 325-1 and the last four bits of each symbol are forwarded to user link constellation mapper 325-2).

User link constellation mappers 325 use lower-order modulation than feeder link constellation mapper 220. The sum of the data rate of the forward user links created by user link constellation mappers 325 may equal or be less than the data rate of feeder link constellation mapper 220. Each user link constellation mapper of user link constellation mappers 325 corresponds to a different forward user link. The modulation used by user link constellation mappers 325 varies based on the SINR of the UE to which particular data is addressed. Therefore, the lower-order modulation used by user link constellation mappers 325 can vary, but remains lower order than the higher-order modulation of the feeder link. The output of user link constellation mappers 325 may be I and Q signals to separate RF front-ends.

RF front-ends 330 may perform digital to analog conversion, amplification, and otherwise convert the output of user link constellation mappers 325 into signals appropriate to be transmitted by transmit antennas of the satellite. The output analog signals from RF front-ends 330 may be transmitted at a same frequency to different geographic regions or may be output at different frequencies to the same or overlapping geographic regions.

Figure 4A:
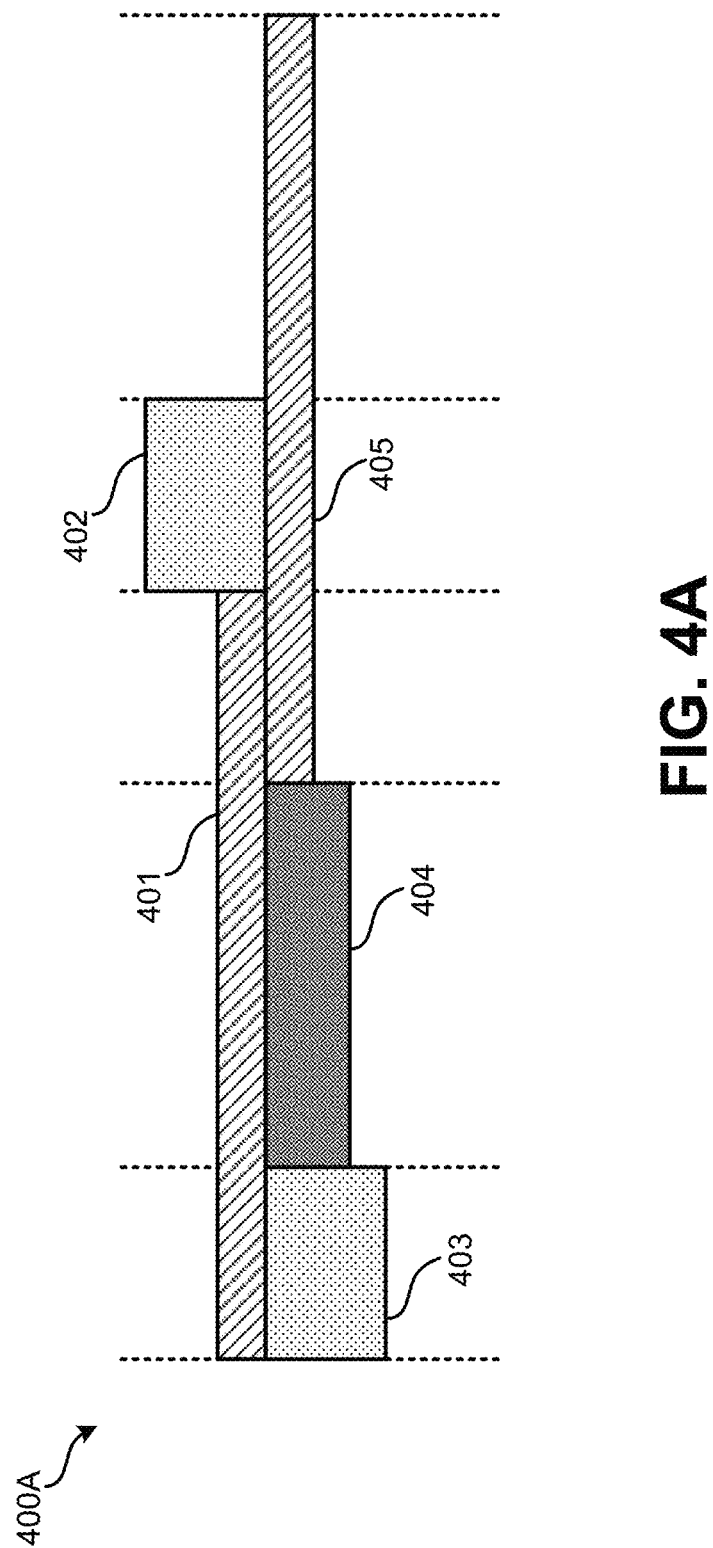
FIGS. 4A and 4B illustrate embodiments of different forms of frame structures that may be used as part of a forward-link satellite transmodulation system.
Figure 4B:
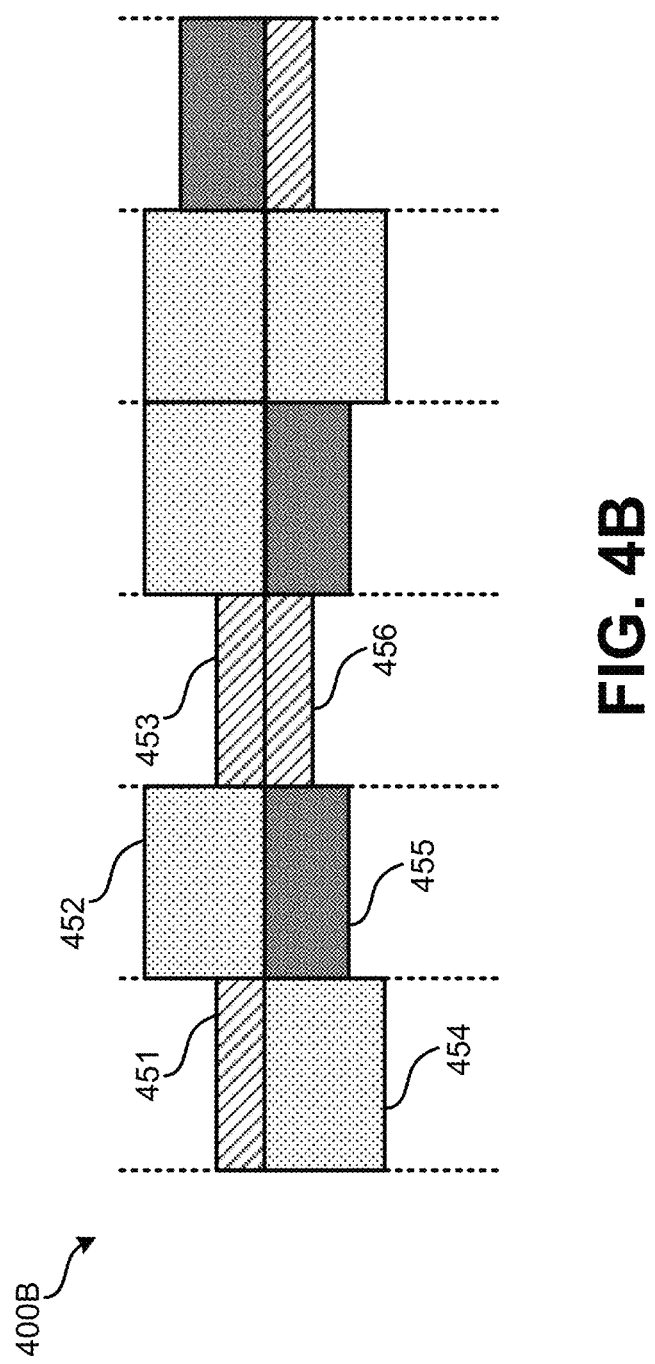

FIGS. 4A and 4B illustrate embodiments of different forms of frame structures that may be used as part of a forward-link satellite transmodulation system. Returning to the forward feeder link creator of FIG. 2, different approaches can be taken when creating forward feed link frames by feeder link constellation mapper 220. In some embodiments, fixed codeword lengths may be used. FIG. 4A illustrates an embodiment 400A of a frame structure of a forward feeder link in which each embedded forward user link has a fixed codeword length.

In FIG. 4A, the number of bits per symbol (i.e. bit width) of each modulated codeword is represented by the relative "thickness" of the codeword in the figure: codewords 401 and 405 are modulated using a lower-order modulation than codeword 404; and codeword 404 is modulated using a lower-order modulation than codewords 402 and 403. Since the codeword lengths are fixed, it takes longer to transmit the same length codeword using the modulation of codewords 401 and 405 than the modulations of codewords 402, 403, or 404. Since the codewords are fixed in length but have different modulations, if different modulations are used by the forward user streams modulated as part of a single forward feeder link, the frame boundaries will not always align. At the satellite, further processing will be needed to manage synchronization since the frame boundaries will not always be aligned.

In FIG. 4B, similar to FIG. 4A, the bit width per symbol of each modulated codeword is represented by the thickness of the codeword. However, in FIG. 4B, a fixed frame length is used for feed link frames. Therefore, the codeword length of the forward user links varies. Each frame, regardless of modulation, has a same fixed frame length. Codewords 451, 453, and 456 are modulated using a lower-order modulation than codeword 455. Codeword 455 is modulated using a lower-order modulation than codewords 452 and 454.

Since the frame length is fixed, each frame will begin and end at a same time with the modulated forward feeder link signal. A different Feeder Link SOF (FSOF) can be inserted to indicate different ways of bit concatenation at the gateway. This information can be used on satellite to slice the bit stream and demultiplex into two or more bit streams. Since the frame boundary is known, consistent, and relatively easier to detect, synchronization information can be inserted at the satellite when transmodulation into the forward user links is performed. This arrangement further allows the boundary of each forward user link frame to match with the boundary of each feeder link frame.

Figure 5:
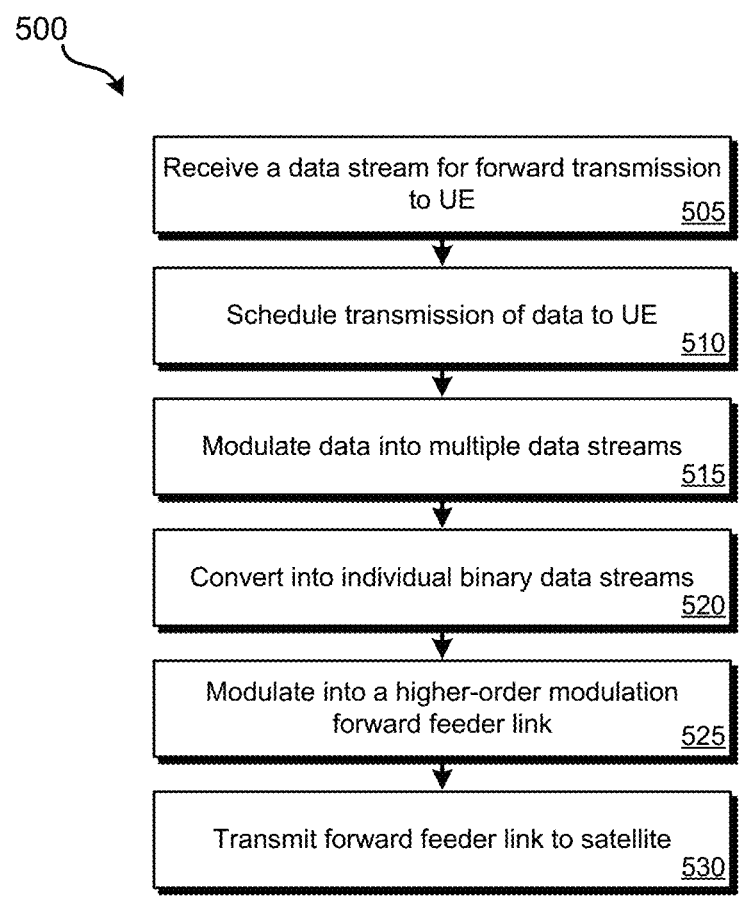
FIG. 5 illustrates an embodiment of a method for performing forward-link transmodulation at a gateway for transmission to a satellite.

Various methods may be performed using the systems, devices, and arrangements of FIGS. 1-4B. FIG. 5 illustrates an embodiment of a method 500 for performing forward-link transmodulation at a gateway for transmission to a satellite. Method 500 may be performed using system 100 of FIG. 1 and forward feeder link creator 112 of FIG. 2. Each block of method 500 may be performed by forward feeder link creator 112.

At block 505, data packets may be received by the gateway that are addressed to various UE services by the gateway. For instance, the data packets can include media or broadband internet-related data packets addressed to UE. At block 510, transmission of the data packets may be scheduled. This can include some data packets being prioritized over other data packets or the amount of bandwidth allocated to transmission of data packets addressed to a particular UE being throttled. Further, the data packets may be assigned to forward user links that will be received by the UE to which the data packets are addressed. For example, a first data packet may be assigned to a first forward user link and a second data packet may be assigned to a second forward user link.

At block 515, the data assigned to each forward user link may be modulated using a lower order modulation that is selected based on the SINR for transmission from the satellite to the addressed UE. At block 515, the FSOF can be replaced with a DVBS2 SOF and the rest of the bits may be mapped into the appropriate constellation based on the feeder link SOF pattern. The lower order modulations used for the different user links may be the same or different. The types of modulation can include pi/2 BPSK, 16APSK, 8PSK, 16-QAM, etc. In addition to performing the lower-order modulation, it is possible that additional processing may be performed such as scrambling of the data payloads and pilot insertion. Block 515 may include the output of separate I and Q signals for each forward user link.

At block 520, each I and Q signal may be converted into a raw binary stream. A binary converter may be used for each pair of I and Q signals to perform hard decision decoding. The binary converter may have access to one or more modulation constellations that correspond to the types of modulation available for use at block 515. The number of bits decoded from the I and Q signals varies based on the type of lower-order modulation used. Each binary converter outputs a raw stream of binary data that corresponds to a particular forward user link.

At block 525, the raw binary streams may be combined and modulated using a higher-order modulation. Specifically, for each symbol to be created, the raw binary streams may be sampled according to a defined pattern. For example, for 256-QAM, in which each symbol corresponds to eight bits, the first four bits may be obtained from the first binary stream and the second four bits may be obtained from the second binary stream. By using such a pattern, the satellite, when performing decoding, would always map the first four bits to the first forward user link and the last four bits to the second forward user link. Other defined patterns may be used as long as the satellite as access to the predefined pattern. Regardless of the bit pattern used to multiplex the two (or more) binary streams, the output may be I and Q signals that are used by an RF front-end to create an RF signal for transmission to the satellite. The modulation used is higher-order than the lower-order modulation used at block 515. Specifically, the data rate per symbol of the higher-order modulation is at least as great as the summation of the data rate of the lower-order modulations used at block 515. At block 530, the forward feeder link is transmitted by the gateway system to the satellite.

Figure 6:
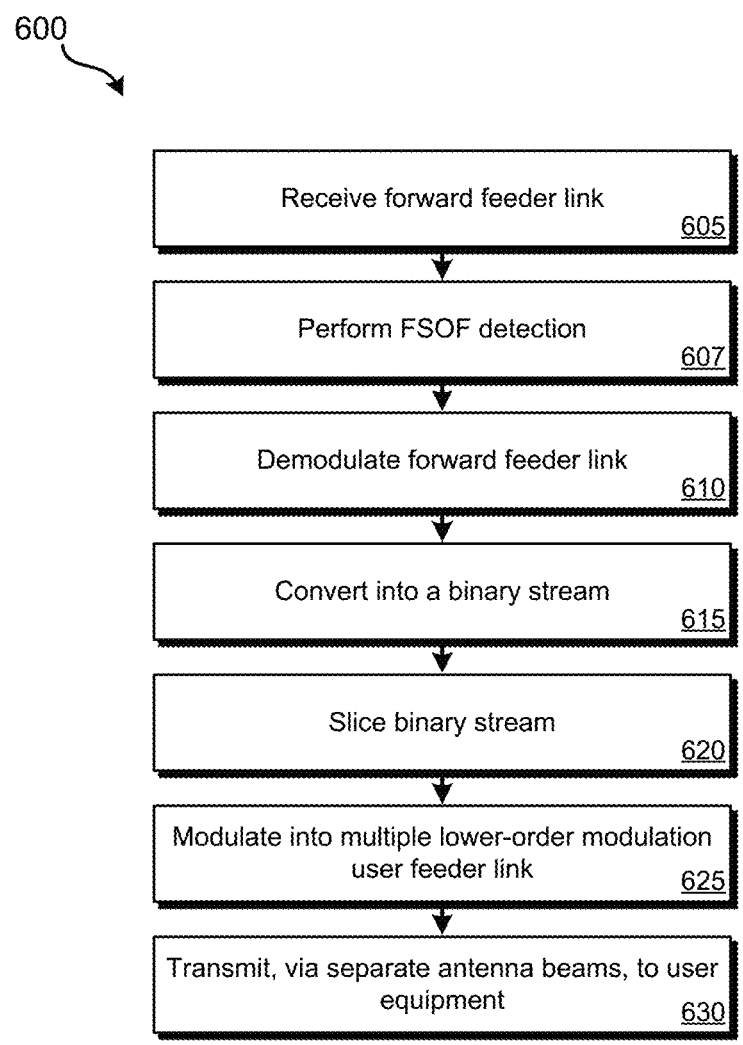
FIG. 6 illustrates an embodiment of a method for performing forward-link transmodulation at a satellite for transmission to user equipment.

FIG. 6 illustrates an embodiment of a method 600 for performing forward-link transmodulation at a satellite for transmission to user equipment. Method 600 may be performed using system 100 of FIG. 1 and forward link satellite transmodulation system 300 of FIG. 3. Each block of method 600 may be performed by forward link satellite transmodulation system 300. Method 600 may be performed in concert with method 500. That is, method 500 and method 600 can be combined to a single method that is performed together by the satellite and the gateway.

At block 605, the forward feeder link, which is encoded with the higher-order modulation, is received by the satellite from the gateway. In some embodiments, the received analog signal is processed and converted to a digital signal. Block 605 can involve initial amplification, conversion, and processing by an RF front end of the satellite. At block 607, the Feeder Link SOF (FSOF), can be detected and analyzed. The FSOF is in the place of the original SOFs created at block 515. Information from and timing based on the FSOF may be used to determine the number of forward user links to be created, how bit slicing should be performed, and the types of demodulation used. At block 610, the forward feeder link is demodulated into I and Q signals. These I and Q signals are passed to a binary coder.

At block 615, hard decision binary coding is performed. The I and Q signals are analyzed against a constellation corresponding to the higher-order modulation used for modulation by the feeder link. Each symbol is converted into some number of bits based on the type of modulation used. For example, if 256-QAM is used as the higher-order feeder link modulation, each I/Q symbol is converted into eight bits. A raw stream of binary data is output. No buffering may be needed at the satellite since a hard decision based on the symbol is used to immediately output raw binary data. Lack of buffering may help decrease power usage at the satellite (and cost of the satellite).

At block 620, the raw stream of binary data is sliced or demultiplexed. A stored/known relationship of how data is encoded into the symbols can be used to accurately demultiplex the binary data into two (or more) binary streams that each correspond to a particular forward user link. For example, if 256-QAM is used, the first four bits of each symbol may be defined to correspond to the first forward user link and the last four bits of each symbol may be defined to correspond to the second forward user link.

At block 625, each binary stream that corresponds to a forward user link may be modulated according to a lower-order modulation. The specific lower-order modulation used for data addressed to a particular UE may be selected based on SINR of the satellite's forward user link (and, possibly, the forward feeder link SINR) as received by the particular UE. For DVBS2, a first very low-level modulation may be used for a packet header (PLHeader) such that all UE can read the packet header. A second lower-level modulation (which would typically be a higher-order modulation than the header, but lower order modulation than the feeder link) would be used for the payload. Modulation of each forward user link occurs independently, therefore, at a given time, the same of different lower-order modulations may be used.

At block 630, each modulated forward user link is transmitted by the satellite via an antenna of the satellite to UE on earth. Each forward user link may be transmitted using the same frequency to different geographic regions or to the same or overlapping geographic regions using different carrier frequencies. From the perspective of the UE, the UE may be unaware of any changes to the forward feeder link because the UE only receives the forward user link.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A forward-link satellite transmodulation system comprising:
  a gateway system, comprising:
    a forward feeder link creator that:
      receives a first data stream for a first forward link signal and a second data stream for a second forward link signal; and
      modulates the first data stream and the second data stream into a higher-order modulation forward feeder link having a higher-order digital modulation scheme; and
    a transmitter that transmits the higher-order modulation forward feeder link to a satellite; and
  the satellite, comprising:
    a receiver that receives the higher-order modulation forward feeder link;
    a demodulator that demodulates the higher-order modulator forward feeder link into a raw bit stream;
    a bit slicer component that separates the raw bit stream into a first bit stream and a second bit stream; and
    a modulator that modulates the first bit stream into a first user equipment (UE) forward link having a first lower-order digital modulation scheme and the second bit stream into a second UE forward link having a second lower-order digital modulation scheme, wherein:
      the higher-order digital modulation scheme comprises higher order modulation than the first lower-order digital modulation scheme and the second lower-order digital modulation scheme.

2. The forward-link satellite transmodulation system of claim 1, wherein the forward feeder link creator further comprises:
  a first modulator that modulates the first data stream using the first lower-order digital modulation scheme; and
  a second modulator that modulates the second data stream using the second lower-order digital modulation scheme.

3. The forward-link satellite transmodulation system of claim 2, wherein the forward feeder link creator further comprises:
  a first raw bit stream creator that receives a first output of the first modulator and outputs a first raw bit stream; and
  a second raw bit stream creator that receives a second output of the second modulator and outputs a second raw bit stream.

4. The forward-link satellite transmodulation system of claim 3, wherein the forward feeder link creator further comprises:
  a feeder link modulator that modulates the first raw bit stream and the second raw bit stream into the higher-order modulation forward feeder link having the higher-order digital modulation scheme.

5. The forward-link satellite transmodulation system of claim 1, wherein the satellite further comprises a satellite transmitter that transmits the first UE forward link and the second UE forward link.

6. The forward-link satellite transmodulation system of claim 5, wherein the satellite transmitter transmits the first UE forward link to a different geographical region than the second UE forward link.

7. The forward-link satellite transmodulation system of claim 5, wherein the satellite transmitter transmits the first UE forward link to a same geographical region as the second UE forward link.

8. The forward-link satellite transmodulation system of claim 1, wherein the first lower-order digital modulation scheme and the second lower-order digital modulation scheme is a same modulation scheme but is different than the higher-order digital modulation scheme.

9. The forward-link satellite transmodulation system of claim 1, wherein the first lower-order digital modulation scheme and the second lower-order digital modulation scheme are different modulation schemes and are additionally different than the higher-order digital modulation scheme.

10. The forward-link satellite transmodulation system of claim 9, wherein a fixed code length is used for the first lower-order digital modulation scheme and the second lower-order digital modulation scheme.

11. The forward-link satellite transmodulation system of claim 9, wherein a fixed frame length is used for the first lower-order digital modulation scheme and the second lower-order digital modulation scheme.

12. The forward-link satellite transmodulation system of claim 1, wherein:
the gateway system is a gateway to the Internet; and
the first data stream and the second data stream comprises data received by the gateway from the Internet being transmitted by remote server system to UE via the first data stream and the second data stream.

13. The forward-link satellite transmodulation system of claim 1, wherein the higher-order digital modulation scheme is 256 quadrature amplitude modulation (QAM).

14. A method for performing transmodulation of a forward feeder link, the method comprising:
receiving a first data stream for a first forward link signal and a second data stream for a second forward link signal; and
modulating the first data stream and the second data stream into a higher-order modulation forward feeder link having a higher-order digital modulation scheme;
receiving, by a satellite, the higher-order modulation forward feeder link;
demodulating, by the satellite, the higher-order modulator forward feeder link into a raw bit stream;
separating, by the satellite, raw bit stream into a first bit stream and a second bit stream; and
modulating, by the satellite, the first bit stream into a first user equipment (UE) forward link having a first lower-order digital modulation scheme and the second bit stream into a second UE forward link having a second lower-order digital modulation scheme, wherein:
the higher-order digital modulation scheme comprises higher order modulation than the first lower-order digital modulation scheme and the second lower-order digital modulation scheme.

15. The method for performing transmodulation of the forward feeder link of claim 14, further comprising:
modulating the first data stream using the first lower-order digital modulation scheme; and
modulating the second data stream using the second lower-order digital modulation scheme.

16. The method for performing transmodulation of the forward feeder link of claim 15, further comprising:
creating a first raw bit stream based on the modulated first data stream; and
creating a second raw bit stream based on the modulated second data stream.

17. The method for performing transmodulation of the forward feeder link of claim 16, further comprising:
modulating the first raw bit stream and the second raw bit stream into the higher-order modulation forward feeder link having the higher-order digital modulation scheme.

18. The method for performing transmodulation of the forward feeder link of claim 17, further comprising:
transmitting, by the satellite, the first UE forward link to a different geographical region than the second UE forward link.

19. The method for performing transmodulation of the forward feeder link of claim 17, further comprising:
transmitting, by the satellite, the first UE forward link to a same geographical region as the second UE forward link.

20. The method for performing transmodulation of the forward feeder link of claim 14, wherein the first lower-order digital modulation scheme and the second lower-order digital modulation scheme is a same modulation scheme but is different than the higher-order digital modulation scheme.

* * * * *